Oct. 24, 1933.  E. DUHME  1,932,067
PROCESS OF PRODUCING WELL CONDUCTING ELECTRIC CONNECTIONS BETWEEN A LAYER
OF A METAL COMPOUND AND A COATING OF A DUCTILE METAL APPLIED TO IT
Filed Nov. 27, 1929

WITNESSES:

INVENTOR
Emil Duhme.
BY
ATTORNEY

Patented Oct. 24, 1933

1,932,067

UNITED STATES PATENT OFFICE 1,932,067

PROCESS OF PRODUCING WELL-CONDUCTING ELECTRIC CONNECTIONS BETWEEN A LAYER OF A METAL COMPOUND AND A COATING OF A DUCTILE METAL APPLIED TO IT

Emil Duhme, Berlin-Siemensstadt, Germany, assignor to Westinghouse Electric and Manufacturing Company, a corporation of Pennsylvania Application November 27, 1929, Serial No. 410,269, and in Germany December 5, 1928

4 Claims. (Cl. 175—366)

My invention relates to a process of producing well-conducting electric connections between a layer of a metal compound and a coating of a ductile metal applied to it.

It is already known to produce a good electrical contact between a layer of a metal compound, for instance the active layer of a copper oxide or other dry rectifier, and a conductor by applying to the layer of metal compound ductile metal (such as zinc) either by spraying or in any other suitable manner. The rectifier plates produced in this way can be loaded with comparatively strong currents and give an excellent and sure discharge of current even if hardly any pressure is applied to them.

After long use of the rectifier the metal coating applied to the layer of oxide of copper sometimes shows a tendency to detach itself gradually from its base. Together with its adhesive capacity it then also loses its good electric conductivity. The cause of this occurrence appears to be traceable partly to the action of pulsations and partly to the corrosive action of the humidity of the air.

The object of my invention is to eliminate this drawback with certainty and to produce oxide rectifier plates of unlimited durability in mechanical and electrical respects. To attain this end in view I apply to the metal coating a layer which contains a metal compound rich in oxygen. This may, for instance, be effected by stirring red oxide of lead or peroxide of lead with varnish lacquer and applying the mixture to the metal coating by means of a brush or by spraying. In both cases excellent results are obtained. Instead of the oxides of lead oxides of iron or manganese may equally well be used.

Figure 1:
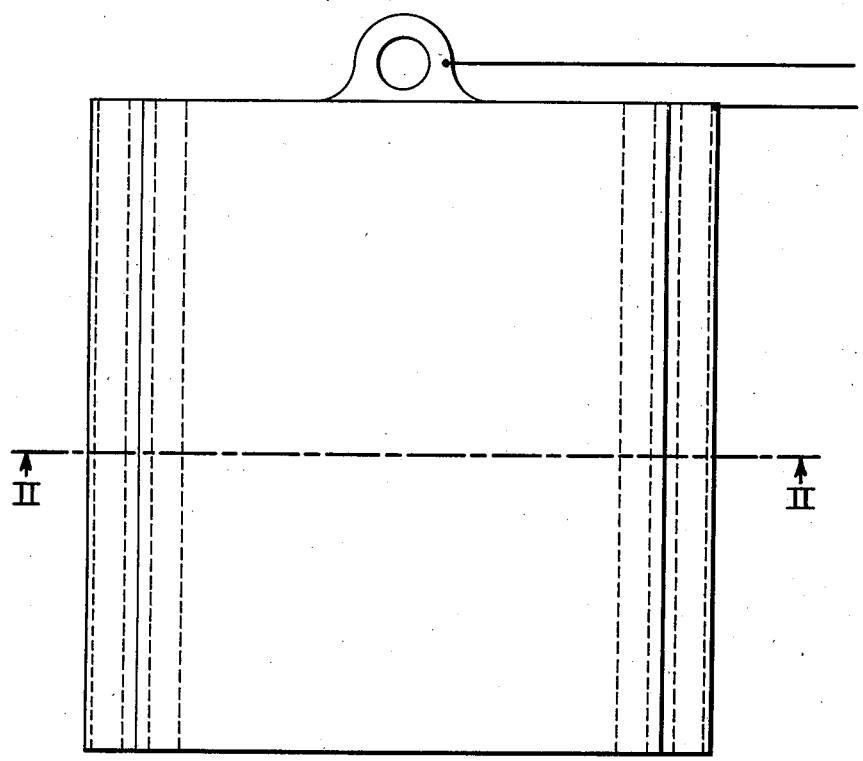
Figure 1 is a plan view of a dry rectifier embodying my invention.
Figure 2:
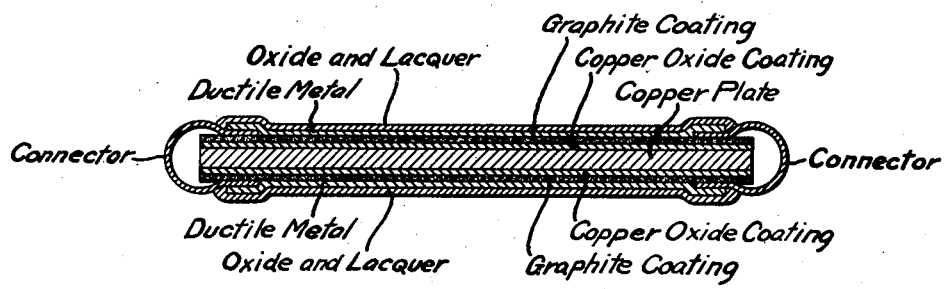
Fig. 2 is a cross-section on line II—II of Figure 1, illustrating the various preferred layers of material in the dry rectifier.

The adhesion of the metal coating on the metal compound layer underneath may be still further improved by first applying a thin intermediate layer of graphite in finest distribution to the metal compound layer prior to the application of the metal coating, and then spraying on the ductile metal and finally coating this ductile metal with the mixture of metal oxide and varnish lacquer. The plates thus treated are distinguished by an extraordinary firm adhesion of the sprayed metal coating and possess a far longer life than plates produced by known processes. Their metal coating, in particular, is absolutely corrosion-proof.

It will be understood that instead of the varnish lacquer any other suitable lacquer or enamel may be employed. Particularly suitable are lacquers the solvent of which contains no alcohol.

The finished plate may be painted with a suitable waterproof lacquer, for instance one containing oil, to protect its surface against the action of the humidity of the air. This lacquer does not penetrate so far into the layer of the metal oxide as to have an effect on the contact resistance between the coating of the ductile metal and the layer of metal compound underneath it. The application of my invention is, of course, not limited to dry rectifiers but may be applied in all cases in which a well conducting and above all durable electric connection is to be made.

I claim as my invention:

1. A rectifier comprising copper having a portion of its surface oxidized, a layer of graphite on said oxidized surface, a ductile metal coating on said layer of graphite, a metal oxide coating on said ductile metal coating and electrical connections to said copper and said ductile metal.

2. The method of forming a rectifier which comprises oxidizing a portion of the surface of a piece of copper, placing a ductile metal layer in electrical contact with said oxidized surface, coating said ductile metal with an oxide compound in a liquid carrier and drying said last mentioned coating.

3. The method of protecting the copper oxide contact surface of a copper oxide rectifier which comprises coating said copper oxide surface with a ductile metal contact layer, spraying said ductile metal contact metal layer with a layer of oxide compound in a liquid carrier and drying said last mentioned layer.

4. A rectifier comprising copper having a portion of its surface oxidized, a ductile metal coating superposed on and in electrical connection with said oxidized surface, a metal oxide coating on said ductile metal coating and electrical connections to said copper and said ductile metal.

EMIL DUHME.